United States Patent [19]

Ikenoue et al.

[11] Patent Number: 5,259,860

[45] Date of Patent: Nov. 9, 1993

[54] SINTERED METAL PARTS AND THEIR PRODUCTION METHOD

[75] Inventors: Yutaka Ikenoue; Ryoji Satoh; Koichiro Hayashi; Katsunao Chikahata, all of Chiba, Japan

[73] Assignee: Hitachi Powdered Metals Co., Ltd., Japan

[21] Appl. No.: 773,730

[22] Filed: Oct. 9, 1991

[30] Foreign Application Priority Data

Oct. 18, 1990 [JP] Japan ................... 2-280219
Oct. 18, 1990 [JP] Japan ................... 2-280220

[51] Int. Cl.$^5$ .................................. C22C 29/00
[52] U.S. Cl. ...................... 75/231; 75/243; 75/244; 75/246; 419/11; 419/12; 419/13; 419/19; 419/38; 419/66
[58] Field of Search .............. 75/231, 235, 243, 244, 75/246; 419/11-13, 19, 38, 66

[56] References Cited

U.S. PATENT DOCUMENTS

| | | | |
|---|---|---|---|
| 3,754,891 | 8/1973 | Bryk et al. | 75/23 |
| 3,844,800 | 10/1974 | Hooton | 75/233 |
| 4,623,590 | 11/1986 | Hodes et al. | 428/408 |
| 4,946,499 | 8/1990 | Sakuranda et al. | 75/343 |
| 5,127,939 | 7/1992 | Panigrahy et al. | 75/323 |

Primary Examiner—Donald P. Walsh
Assistant Examiner—Ngoclan T. Mai
Attorney, Agent, or Firm—Wegner, Cantor, Mueller & Player

[57] ABSTRACT

A sintered metal part has a magnesium metasilicate mineral, or a magnesium metasilicate mineral and a magnesium orthosilicate mineral, or at least one of a magnesium metasilicate mineral and a magnesium orthosilicate mineral and at least one of boron nitride and manganese sulfide dispersed throughout the metal matrix. An iron-based sintered sliding member is of a structure that free graphite and an intercrystalline inclusion have been dispersed throughout the metal matrix that consists essentially of, in weight ratio, 1.5 to 4% of carbon, 1 to 5% of copper, 0.1 to 2% of tin, 0.1 to 0.5% of phosphorus, 0.5 to 2% of an intercrystalline inclusion and the balance of Fe and has a mixed structure of a pearlite matrix with a steadite phase, the intercrystalline inclusion being a magnesium metasilicate mineral, or a magnesium metasilicate mineral and a magnesium orthosilicate mineral, or at least one of a magnesium metasilicate mineral and a magnesium orthosilicate mineral and at least one of boron nitride and manganese sulfide.

14 Claims, No Drawings

SINTERED METAL PARTS AND THEIR PRODUCTION METHOD

BACKGROUND OF THE INVENTION

The present invention relates to inexpensive sintered metal parts, which have improved solid lubricating effects such as excellent machinability, wear resistance and plastic workability, and to producing them.

As well known so far in the art, powder compact-forming properties, machinability, wear resistance, slidability and other properties are imparted to sintered metal parts or their sintering precursors by adding to them solid lubricants such as graphite, molybdenum disulfide, boron nitride and talc.

Of the above-mentioned solid lubricants, talc in particular has been reported to serve well as both a binder for forming metal powders and a lubricant, as set forth in Claus G. Goetzel, "TREATISE ON POWDER METALLURGY", Vol. 1, pp. 254-256 (1949).

More illustratively, materials obtained by forming and sintering iron or ferroalloy powders having a talc content of 0.1 to 5% by volume are known to have improved free cutting properties to increase the service life of cutting tools, as disclosed in Japanese Patent Laid-Open No. 63(1988)-93842.

As set forth in Japanese Patent publication No. 63(1988)-118047, sintered metal parts made by forming and sintering metal powders having a talc content of 0.1 to 10% by weight are known to have improved compression denseness, machinability and other properties and increased resistance to sticking wear, thus lending themselves well fit for internal combustion engine valve seats and guides.

Thus, sintered metal parts obtained by forming and sintering mixed metal powders containing talc have a major advantage of being not only improved in terms of machinability and wear resistance but limited in terms of friction resistance to molds when compacted as well. Their another merit is that the price of talc itself is relatively law little.

Since talc powders—$Mg_3Si_4O_{10}(OH)_2$—contain some moisture, however, when compacts of mixed metal powers containing such talc powders are sintered, it is likely that talc might suffer dehydration and decomposition in the course of heating, increasing the dew points of reducing atmospheric gases.

For that reason, unless sintering conditions are placed under strict control in obtaining sintered metal parts of sophisticated geometries such as internal combustion engine valve seats and guides, it may then be impossible to impart desired properties to the resulting sinterings.

Especially where such compacts are continuously fed in large quantities into a sintering furnace, the intra-furnace gases are contaminated so severely that care should be taken to reduce the amount of talc added, increase the quantity of the intrafurnace gases supplied or use some special-purpose sintering furnaces, resulting in necessity of additional processes.

In addition, talc is broken down into magnesium metasilicate—$MgSiO_3$ and hard silicon dioxide—$SiO_2$ in the course of sintering by heating. This appears to have been caused by a silicon dioxide. Sintered metal parts obtained by adding talc to them may attack or abrade the associated sliding members.

One object of this invention is to provide a sintered metal part well suited for sintered metal slugs, etc. used especially for producing internal combustion engine valve seats or guides, oil-impregnated bearings, gears and other members by means of plastic working, and a method for making such a metal part.

The present invention is also directed to an iron-based sintered sliding member which is best suited for various bearings and built up of a sintered alloy improved in terms of wear resistance and free cutting properties.

So far, wear-resistant sliding members suitable for various purposes have been available, which are formed of an iron-based sintering material containing a large amount of solid lubricating graphite so as to impart wear resistance thereto and in which a part of the graphite has been diffused throughout the matrix in the course of sintering and allowed to remain as free graphite after sintering so as to make use of the lubrication of the residual graphite.

In order to obtain free graphite, however, this sintering-material has to be sintered at a temperature lower than that applied to generally available iron-based materials, resulting in a decrease of intercrystalline bond strength and so making the sliding member likely to wear away when used under high pressure conditions.

In some efforts to eliminate the defect of the above-mentioned iron-based sintered sliding members, it has been proposed to sinter a sintering feed material containing given amounts of copper, tin and phosphorus in a liquid phase at 980° to 1100°, thereby dispersing free graphite throughout a pearlite structure containing a ternary Fe-P-C eutectic (steadite phase) in a mixed form. In this regard, see Japanese Patent Publication No. 54(1979)-42335 or Japanese Patent Publication No. 55(1980)-34858.

The thus improved iron-based sintered sliding members have been shown to enhance the strength of the sintering feed rather than to lower it even upon sintered at a relatively low temperature; they lend themselves well fit for sliding parts used under high pressure conditions, like bearings. However, they have a grave defect of being poor in free cutting properties and leave much to be desired in this regard.

Thus, another object of this invention is to provide an iron-based sintered sliding member built up of a sintered alloy excelling in wear resistance, free cutting properties and other properties, which can be used even under high pressure condition and is primarily improved in terms of machinability over the conventional sintered sliding member.

SUMMARY OF THE INVENTION

According to one aspect of this invention, the first object of this invention is attained by the provision of a sintered metal part characterized in that a magnesium metasilicate mineral, or a magnesium metasilicate mineral and a magnesium orthosilicate mineral, or at least one of a magnesium metasilicate mineral and a magnesium orthosilicate mineral and at least one of boron nitride and manganese sulfide have been dispersed throughout the metal matrix, preferably in a total amount of 0.1 to 4% by weight.

In a preferable embodiment, this sintered metal part takes the form of a sintered metal slug used for producing internal combustion engine valve seats or guides, oil-impregnated bearings, gears and other members.

According to this aspect, the sintered metal part is produced by a method including the steps of compression forming and sintering a die feed material, a substantial portion of which comprises metal powders, said method being characterized in that a magnesium metasilicate mineral powder, or a magnesium metasilicate mineral powder and a magnesium orthosilicate mineral powder, or at least one of a magnesium metasilicate mineral powder and a magnesium orthosilicate mineral powder and at least one of boron nitride and manganese sulfide have been dispersed throughout the metal matrix in a total amount of 0.1 to 4% by weight, and said magnesium metasilicate mineral powder is at least one of enstatite, clinoenstatite, enstenite and hypersthen powders, and said magnesium orthosilicate mineral powder is at least one of forsterite and chrystolite powders.

According to another aspect of the invention, the second object of the invention is attained by the provision of an iron-based sintered sliding member characterized in that it is of a structure that free graphite and an intercrystalline inclusion have been dispersed throughout the metal matrix that consists essentially of, in weight ratio, 1.5 to 4% of carbon, 1 to 5% of copper, 0.1 to 2% of tin, 0.1 to 0.5% of phosphorus, 0.5 to 2% of an intercrystalline inclusion and the balance of Fe and has a mixed structure of a pearlite matrix with a steadite phase, said intercrystalline inclusion being a magnesium metasilicate mineral, or a magnesium metasilicate mineral and a magnesium orthosilicate mineral, or at least one of a magnesium metasilicate mineral and a magnesium orthosilicate mineral and at least one of boron nitride and manganese sulfide.

DETAILED DESCRIPTION OF THE INVENTION

First Aspect of the Invention

Expressed by $MgSiO_3$, magnesium metasilicate is said to occur naturally in some forms of different crystal structures, including rhombic enstatite and monoclinic clinoenstatite.

Generally, magnesium metasilicate may be refined from naturually occurring ores in the form of a solid solution of a silicate of Mg with a silicate of Fe or a solid solution of this solid solution with a silicate of Mg, as expressed in terms of $(Mg, Fe)SiO_3$, and includes enstenite and hypersthen, for instance.

In the present disclosure, by the term "magnesium metasilicate mineral" are meant such magnesium metasilicates as mentioned above and silicates containing them.

On the other hand, magnesium orthosilicate is expressed by $Mg_2SiO_4$ and available in the form of an ore industrially called a forsterite. As is the case with magnesium metasilicate, this generally takes the form of a solid solution of silicates of Mg and Fe, including chrysolite by way of example.

Chrysolite is a solid solution containing forsterite $(Mg_2SiO_4)$ and fayalite $(Fe_2SiO_4)$ optionally with tephroite $(Mn_2SiO_4$ as expressed in terms of $(Mg, Fe)_2SiO_4$ or $(Mg, Fe, Mn)_2SiO_4$.

In the present disclosure, by the term "magnesium orthosilicate mineral" are meant such magnesium orthosilicates as mentioned above and silicates containing them.

The magnesium meta- and orthosilicate minerals have a specific gravity of the order of 3.2 to 3.9 and can serve well as a solid lubricant because they can cleave well enough.

They may produce a lubricating action in an amount of 0.1% by weight or more and become more effective as they increase in quantity. At more than 4% by weight, however, they are not desirable because they are so large in volume that the resulting sinterings decrease in strength. Thus, they should preferably be used in the quantitative range of 0.1 to 4% by weight.

Such minerals are so lipophilic that they can retain lubricating oils, etc., and are so relatively stable to heat that they cannot decompose at sintering temperatures usually used for powder metallurgy; metal powders—to which powders of the above-mentioned magnesium silicate minerals having such properties have been added—can be well formed with a forming die because their friction with the die is decreased.

In this connection, it is noted that the magnesium orthosilicate mineral is preferably used in combination with the magnesium metasilicate mineral, because the former is harder and more unlikely to cleave than the latter.

A comparison of talc-containing sintered metal parts with the sintered metal parts containing the magnesium silicate minerals according to this invention indicates that the latter are less likely to attack the associated members, but are somewhat poor in their own wear resistance.

According to this invention, however, such a defect can be eliminated by dispersing at least one of boron nitride and manganese sulfide together with the magnesium metasilicate mineral and/or the magnesium orthosilicate mineral throughout the metal matrix. Thus, boron nitride or manganese sulfide serves as a solid lubricant and so makes a great contribution to improving the wear resistance of sintered metal parts.

From a comparison of boron nitride with manganese sulfide, the revealed is that it is boron nitride that is much superior in machinability and it is magnesium sulfide that is much superior in wear resistance.

For the same reasons as referred to in conjunction with the lubrication of the magnesium silicate minerals, boron nitride and/or manganese sulfide should be used together with the above-mentioned magnesium silicate minerals in the quantitative range of 0.1 to 4% by weight.

While in what proportion at least one of boron nitride and manganese sulfide is used in combination with the magnesium silicate minerals is not critical, the amount of the former should preferably be half or lower than that of the latter, because the former cost about 10 to 30 times higher than the latter.

EXAMPLES OF THE FIRST ASPECT

The first aspect of this invention will now be explained at great length with reference to the following non-restrictive examples, wherein the compositions and proportions will be given by weight.

EXAMPLE 1

A mixed metal powder feed was provided, which consisted essentially of 1.5% of electrolytic copper powders, 0.8% of graphite powders, 0.8% of zinc stearate and the balance of atomized iron powders.

To this feed were added enstatite, clinoenstatite, hypersthen and enstenite—the magnesium metasilicate minerals, forsterite and chrysolite—the magnesium orthosilicate minerals, and talc generally used so far, each in a powder form and in an amount of 1%, thereby preparing sintering feeds.

Then, the sintering feeds were each formed at a forming density of 6.8 g/cm³ into a 20-mm thick given shape, and subsequently sintered at a temperature of 1150° C. in a butane-modified gas to obtain samples.

Each sample was found to have a pearlite structure containing bound carbon in an amount of approx. 0.6%.

Then, the machinability and wear resistance were measured of the above-mentioned respective samples.

It is noted that the machinability of each 20-mm thick sample was measured by drilling it with a 6-mm diameter drill under a load of 42 kg at 500 rpm and assayed in terms of how long it takes for the drill to go through the sample.

As a result, it was found that the magnesium silicate-free and talc-containing samples took 65 seconds and 45-51 seconds, respectively, but the instant samples containing various magnesium silicate minerals took 43-49 seconds, meaning that they could be fast machined.

Abrasion tests were carried out with a pin-on-disk type of frictional abrasion tester in which the pin was formed of each sample and the disc was built up of machine-structural carbon steel S45C. The pin was then slid on the disc under a load of 20 kgf/cm² at a sliding speed of 3.1 m/sec. for 10 minutes to measure the abrasion loss.

As a result, it was found that the magnesium silicate-free and talc-containing samples showed abrasion losses of 83 μm and 42-47 μm in contrast to 45-52 μm in the instant samples containing the magnesium silicate minerals, which mean that they have a much more improved solid lubricating effect.

As can be seen from the above-mentioned results, the magnesium silicate minerals according to this invention are superior in machinability but somewhat inferior in wear resistance.

As also understood, the magnesium orthosilicate minerals are inferior to the magnesium metasilicate minerals in terms of both machinability and wear resistance.

EXAMPLE 2

As in Example 1, a mixed metal powder feed was provided, consisting essentially of 1.5% of electrolytic copper powders, 0.8% of graphite powders, 0.8% of zinc stearate and the balance being atomized iron powder. This feed was then formed and sintered into Comparative Sample 1.

Obtained with the same feed as used for Comparative Sample 1 were Sample 2 containing 0.7% of enstatite powders —magnesium metasilicate and 0.3% of boron nitride powders, Sample 3 containing 0.7% of enstatite powders and 0.3% of manganese sulfide, Sample 4 containing 0.7% of forsterite powders—magnesium orthosilicate and 0.3% of boron nitride and Sample 4 containing 0.7% of forsterite powders and 0.3% of manganese sulfide powders.

The machinability and wear resistance were measured of these samples in similar manners as mentioned in Example 1.

The results are set out in Table 1.

TABLE 1

| Samples | Cutting Time (sec.) | Abrasion Losses (μm) |
|---|---|---|
| 1 | 65 | 83 |
| 2 | 42 | 44 |
| 3* | 44 | 40 |
| 4 | 46 | 50 |

TABLE 1-continued

| Samples | Cutting Time (sec.) | Abrasion Losses (μm) |
|---|---|---|
| 5 | 48 | 46 |

As can be seen from the data, the machinability and wear resistance of the sintered metal parts are improved by adding enstatite or forsterite—magnesium silicates and boron nitride or manganese sulfide to such a mixed metal powder feed as mentioned above.

It is also noted that boron nitride serves to improve machinability in particular (this is true of Samples 2 and 4) and manganese sulfide is effective for enhancing wear resistance,

EXAMPLE 3

As in Example 1, a mixed metal powder feed was provided, consisting essentially of 1.5% of electrolytic copper powders, 0.8% of graphite powders, 0.8% of zinc stearate and the balance being atomized iron powder.

Prepared with this mixed feed were a total of six sintering feeds containing varied amounts of enstatite—magnesium metasilicate, which were each formed into a cylindrical shape at a forming density of 6.6 g/cm³ and then sintered at a temperature of 1150° C. in a butane-modified gas to obtain samples.

The ring-crushing strengths of the respective samples measured are reported in Table 2.

TABLE 2

| Samples | Amounts of Enstatite (%) | Ring-Crushing Strengths (kg/mm²) |
|---|---|---|
| 1 | 0 | 61 |
| 2 | 0.5 | 60 |
| 3 | 1.0 | 55 |
| 4 | 3.0 | 49 |
| 5 | 4.0 | 43 |
| 6 | 5.0 | 30 |

The data reveal that the ring-crushing strengths decrease with an increase in the amount of enstatite powders; the 5% addition makes an about 50% strength reduction as compared with the 0% addition.

EXAMPLE 4

Equal amounts of ferroalloy powders composed of 3.0% of Cr, 0.3% of Mo, 0.3% V and the balance being Fe and ferroalloy powders composed of 6.5% of Co, 1.5% of Ni, 1.5% of Mo and the balance being Fe were mixed together with 1.2% of graphite powders and 0.8% of a forming lubricant zinc stearate. The thus obtained sintering feed was formed into a given valve seat shape and then sintered at a temperature of 1200° C. for 30 minutes in an ammonia-cracked gas to prepare Comparative Sample 1.

It is noted that this alloy has such a composition as set forth in Japanese Patent Publication No. 57(1982)-56547.

Prepared with the above-mentioned sintering feed were Comparative Sample 2 containing 0.8% of talc, Sample 3 containing 0.8% of enstatite powders—magnesium metasilicate, Sample 4 containing 0.5% of enstatite powders and 0.3% of boron nitride and Sample 5 containing 0.5% of enstatite powders and 0.3% of manganese sulfide.

Each of these samples was cut and machined into a given size and mounted on an engine mock-up tester for abrasion testing.

The results are reported in Table 3.

TABLE 3

| Samples | Abrasion Losses (mm) | | |
|---|---|---|---|
| | Seat Surfaces | Valve Surfaces | Total |
| 1 | 0.20 | 0.16 | 0.36 |
| 2 | 0.14 | 0.12 | 0.26 |
| 3 | 0.16 | 0.09 | 0.25 |
| 4 | 0.14 | 0.05 | 0.19 |
| 5 | 0.10 | 0.07 | 0.17 |

The test results indicate that all the samples but Comparative Sample 1 are equally superior in machinability.

As can be understood, Comparative Sample 2 containing talc is more reduced in abrasion loss than Comparative Sample 1.

Sample 3 containing enstatite powders is more increased in the abrasion loss of the seat surface than Sample 2, but superior in the total abrasion loss to, Sample 2; this means that Sample 3 is less likely to attack or abrade the associated member.

In particular, Sample 4—in which a part of enstatite powders has been substituted by boron nitride—is unlikely to attack the associated valve surface.

Sample 5—in which boron nitride in Sample 4 has been replaced by manganese sulfide—is much more reduced in the abrasion loss of the seat surface than Sample 4, but is somewhat more likely to attack the associated valve surface. In this regard, Sample 5 is slightly inferior to Sample 4.

EXAMPLE 5

A mixed metal powder feed consisting essentially of 2.5% of naturally occurring graphite powders, 5% of 10% Sn-Cu alloy powders, 1 % of 15% P-ferroalloy powders, 0.5% of zinc stearate and the balance being atomized iron powders was provided as Comparative Sample 1.

Prepared with this mixed feed were Comparative Sample 2 containing 0.8% of talc powders, Sample 3 containing 0.8% of enstenite powders—the magnesium metasilicate mineral, Sample 4 containing 0.5% of enstenite powders and 0.3% of boron nitride and Sample 5 containing 0.5% of enstenite and 0.3% of manganese sulfide.

These samples were each formed into a given cylindrical shape for a valve guide for an internal combustion engine and then sintered at a temperature of 1000° C. for 30 minutes in an ammonia-cracked gas.

Being a known sintered valve guide material and having a ternary FE-C-P alloy phase—a hard steadite phase—crystallized out in the pearlite matrix of iron, the above-mentioned Comparative Sample 1 is a material excelling in the machinability and wear resistance which valve guides are required to have.

As observed under a microscope, Comparative Sample 2 containing talc was found to have a structure rich in a ferrite phase but instead poor in a hard steadite phase. This appears to be due to sintering having been held in proceeding by the contamination of the intrafurnace gases.

It is noted that other samples were equivalent in structure to Comparative Sample 1.

The machinability of each sample—which was formed into a valve guide of a given cylindrical shape—was measured by feeding a rotating reamer into it under a certain load and finding the length of time required for the reamer to go through it, and is expressed in terms of an index to Comparative Sample 1-100.

The wear resistance of each sample—which was cut and machined into a valve guide of a given size and shape—was measured by mounting it on an engine mock-up. After 100 hours, the inner diameter of the sample and the abrasion loss of the associated loss were found.

The results are set out in Table 4.

TABLE 4

| Samples | Machinability Index | Abrasion Losses (μm) | |
|---|---|---|---|
| | | A | B |
| 1 | 100 | 11 | 6 |
| 2 | 73 | 18 | 9 |
| 3 | 71 | 7 | 4 |
| 4 | 66 | 6 | 3 |
| 5 | 67 | 5 | 3 |

A: Internal Diameter of Sample
B: Outer Diameter of Valve

The data teach that Comparative Sample 2 containing talc excels in machinability but increases in wear resistance due to being rich in the ferrite phase but instead poor in the steadite phase.

Sample 3 containing enstenite powders is excellent in terms of both machinability and wear resistance, and Sample 4 containing enstenite powders and boron nitride and Sample 5 containing enstenite powders and manganese sulfide are both much more improved in these terms.

EXAMPLE 6

Provided were two mixed metal powder feeds known to consist essentially of 10% of tin powders, 2% of molybdenum disulfide powders, 0.2% of zinc stearate and the balance of electrolytic copper powders, one being free from enstatite powders—the magnesium metasilicate mineral and the other containing 3% of enstatite powders.

These feeds were each formed into a compact compressed into a bearing shape, which was sintered at a temperature of 780° C. in an ammonia-cracked gas, sized into given dimensions and finally impregnated with a certain amount of turbine oil to prepare a sample.

Both the obtained samples had a density of 6.4 g/cm$^3$.

Each sample was placed on a filter paper, on which it was heated at a temperature of 150° C. for 10 hours. Afterwards, the oil weight reductions were measured of the samples. As a result, it was found that the enstatite-containing sample could better retain the oil than the other, as expressed in terms of an oil weight reduction of 4%.

Then, both the samples were mounted on bearing testers for testing at a slide speed 30 m/min. under a pressure of 50 kgf/cm$^2$.

The enstatite-free sample increased in the coefficient of friction after 10 hours, showing a sign of unusual abrasion. However, the enstatite-containing sample was kept in normal operation, showing that it excelled in oil retention and lubrication.

EXAMPLE 7

Using ferroalloy powders consisting essentially of 2% of Ni, 0.5% of Mo, 0.2% of Mn and the balance being Fe, provided was a mixed metal powder feed containing 0.4% of naturally occurring graphite and 1% of zinc stearate.

Provided also was a mixed metal powder feed by adding 0.5% of enstatite powder—the magnesium metasilicate mineral and 0.5% of forsterite—the magnesium orthosilicate mineral to the above-mentioned mixed feed.

Then, these mixed feeds were each compressed into a cylindrical compact, which was sintered at a temperature of 1150° C. in an ammonia-cracked gas and hot-forged and annealed to prepare a slug sample for plastic working, said sample having a density ratio of 96 to 98%.

Each slug was plastically extruded into an external gear having 19 teeth and a module of 1.58, using an extruding die having an internal tooth shape, a mandrel to be fitted into the sample and an extruding punch.

The loads required for extrusion was 55 tons for the sample containing enstatite and forsterite and 60 tons for the sample containing no such magnesium silicates.

Thus, it is found that the former sample is superior in plastic workability to the latter.

EFFECTS OF THE FIRST ASPECT

According to this invention, the magnesium metasilicate mineral, or the magnesium meta- and ortho-silicates minerals, optionally together with at least one of boron nitride and manganese sulfide,—all being stable even upon heated and excelling in lubrication—are dispersed throughout the metal matrix. It is thus possible to provide sintered metal parts capable of producing improved solid lubricating effects such as excellent machinability, wear resistance and plastic workability with no need of using talc, solid lubricants rendering productivity worse.

The thus obtained sintered metal parts have improved solid lubricating effects such as excellent machinability, wear resistance and plastic workability and are less likely to attack the associated members; when they are used as sintering feeds for valve seats or guides, oil-impregnated bearings and sintering metal slugs for plastic working, it is possible to improve the quality of the resulting products.

According to the production method of this invention wherein the anhydrous magnesium silicate minerals are mixed as a solid lubricant with the starting metal powder feed, it is unlikely that the sintering furnace gases may be contaminated—because a conventional solid lubricant likely to suffer dehydration and decomposition in the course of sintering, like talc, is not used, or that the structure of the sintered metal matrix may suffer deterioration—because graphite likely to diffuse into ferroalloys is not used; it is possible to inexpensively provide sintered metal parts having free cutting properties, wear resistance and other properties by ordinary sintering means.

SECOND ASPECT OF THE INVENTION

As already mentioned, the second aspect of this invention is directed to an iron-based sintered sliding member characterized in that it is of a structure that free graphite and an intercrystalline inclusion have been dispersed throughout the metal matrix that consists essentially of, in weight ratio, 1.5 to 4% of carbon, 1 to 5% of copper, 0.1 to 2% of tin, 0.1 to 0.5% of phosphorus, 0.5 to 2% of an intercrystalline inclusion and the balance of Fe and has a mixed structure of a pearlite matrix with a steadite phase, said intercrystalline inclusion being a magnesium metasilicate mineral, or a magnesium metasilicate mineral and a magnesium orthosilicate mineral, or at least one of a magnesium metasilicate mineral and a magnesium orthosilicate mineral and at least one of boron nitride and manganese sulfide.

Sn contained in an amount of 0.1 to 2% in the Fe matrix serves to trigger the formation of a liquid phase and so promote sintering at the low sintering temperature needed to allow graphite to remain as free graphite, thereby improving the strength of the resulting sintered material.

Sn gains effects in the quantitative range of a low of 0.1% to a high of 2%; the use of Sn in excess has been shown to embrittle the sintering material and make the sintered product unstable dimensionally.

Like Sn, Cu contributes to promoting sintering and enhancing strength and gains effects at 1% or more but does not at higher than 5%.

While Cu and Sn may be independently used in powdery forms, there is a difference as to when liquid phases are to be formed, which may otherwise make the feed formulation heterogeneous in composition; it is desired that they be used in the form of Cu-Sn alloy powders.

Added in the form of naturally occurring graphite, C in part remains as free graphite after sintering and in part forms a solid solution with the Fe matrix, crystallizing out a hard ternary FE-P-C eutectic (steadite phase) with the pearlite structure of iron and P to be described later.

Upon addition in amounts of 1.5%, 3% and 4%, for instance, the graphite powders release free graphite in the respective quantities of about 0.3%, 1.7% and 2.7%. When the amount of free graphite added is short of 0.3%, however, the associated sliding member is likely to wear away.

When the amount of the graphite powders added exceeds 4%, on the other hand, there is a decrease in the matrix strength. Thus, the amount of carbon should lie in the range of 1.5 to 4%.

P forms an intermetallic compound with Fe, giving rise to the aforesaid ternary FE-P-C eutectic (steadite phase) which makes some contribution to wear resistance. In order to obtain a desired wear-resistant structure, P should be used in an amount of 0.1% or more but should not in an amount exceeding 1.5%, because the addition of P in excess has been shown to embrittle the matrix and decrease the machinability of the sintered product.

In order to obtain a homogeneous structure, P should preferably be used in the form of Fe-P alloy powders.

In the 2nd aspect of this invention, the magnesium silicates as well as boron nitride and/or manganese sulfide are again used. For details thereof, refer to what has been described in the "First Aspect of the Invention".

EXAMPLE OF THE SECOND ASPECT

The second aspect of this invention will now be explained in greater detail with reference the following non-restrictive example, wherein the compositions and proportions will be given by weight.

EXAMPLE 8

Comparative Sample 1 was obtained by forming a conventional feed into a given shape for an internal combustion engine valve guide, said feed consisting essentially of 2.5% of naturally occurring graphite, 5% of Cu-10% Sn alloy powders, 4% of 85% Fe-15% P alloy powders, 0.5% of zinc stearate and the balance being atomized iron powders, followed by sintering at 1000° C. for 30 minutes in a non-oxidizing atmosphere gas.

In similar manners as described in connection with comparative Sample 1, Comparative Samples 2-4 and Samples 1-8 were prepared with batches of the aforesaid feed which contained, in the amounts set out in Table 5, powders forming the intercrystalline inclusions, viz., enstatite powders an as example of the magnesium metasilicate mineral, forsterite powders as an example of the magnesium orthosilicate mineral and talc for comparative purposes, which has been used so far in the art and belongs to the magnesium metasilicate mineral as well as boron nitride powders and manganese sulfide powders.

TABLE B

| Sample Nos. | Types and Amounts of Intercrystalline Inclusions (%) | | | | | Index to Machinability | Abrasion Losses (μm) | |
|---|---|---|---|---|---|---|---|---|
| | T | E | F | B | S | | Samples | Valves |
| 1 | — | — | — | — | — | 100 | 11 | 6 |
| 2 | 1 | — | — | — | — | 70 | 18 | 9 |
| 3 | — | 0.2 | — | — | — | 94 | 11 | 6 |
| 4 | — | 3 | — | — | — | 61 | 20 | 3 |
| 1 | — | 0.5 | — | — | — | 80 | 9 | 5 |
| 2 | — | 1 | — | — | — | 69 | 7 | 4 |
| 3 | — | 2 | — | — | — | 65 | 8 | 4 |
| 4 | — | — | 1 | — | — | 75 | 7 | 4 |
| 5 | — | 0.5 | 0.5 | — | — | 71 | 7 | 4 |
| 6 | — | 0.5 | — | 0.3 | — | 66 | 6 | 3 |
| 7 | — | 0.5 | — | — | 0.3 | 67 | 5 | 3 |
| 8 | — | — | 0.5 | 0.2 | 0.3 | 65 | 4 | 3 |

T: Talc. E: Enstatite. F: Forsterite. B: Boron Nitride. S: Manganese Sulfide

The machinability of each sample having an internal diameter of 6.5 mm was determined by feeding a 7-mm diameter reamer at 500 rpm under a load of 3.2 Kg through it to finding how long it takes for the reamer to go through it, and was estimated in terms of an index to Comparative Sample 1 defined as 100.

Abrasion testing was carried out with an engine mock-up on which each sample formed into a given valve guide size and shape was mounted. A hundred hours later, the internal diameter of the sample and the abrasion loss of the associated valve were measured.

The results has indicated that in terms of the maximum loads needed to remove the sintered samples from molds, Samples 1-8, Comparative Sample 2 containing talc and Comparative Samples 3-4 are all about 4% lower than Comparative Sample 1, serving well enough as a solid lubricant.

As also understood from Table 5, Comparative Sample 2 containing talc is excellent in machinability but less than satisfactory in abrasion loss.

This would be in part due to the talc—$Mg_3Si_4O_{11} \cdot H_2O$—having been deprived of the water of crystallization in the course of sintering, contaminating the sintering furnace gases and so enhancing the porportion of the ferrite structure in the matrix with the result that the sample is improved in machibility and increased in abrasion, and in part because of a part of the talc having been converted into silicon dioxide—$SiO_2$, abrading the associated valve.

Comparative Sample 3-4 and Samples 1-3 show in what amount the enstatite gains effects, and teach that both the machinability of the samples and the wear resistance of the samples and the associated valves are good enough in the quantitative range of 0.5 to 2%.

However, Comparative Sample 4 containing 3% of enstatite is improved in machinability and unlikely to abrade the associated valve, but suffers much abrasion in itself.

By contrast, Sample 4 containing forsterite is good enough, if not equivalent to the enstatite-containing samples, in terms of both machinability and wear resistance.

Sample 5 containing both enstatite and foresterite has its properties lying halfway between Samples 2 and 4.

Samples 6-8 containing enstatite or forsterite and boron nitride or manganese sulfide concurrently are all much more improved in both machinability and wear resistance than the aforesaid respective samples.

EFFECTS OF THE SECOND ASPECT

In the iron-based sintered sliding member according to this invention, which has enhanced the strength of the sintering feed without giving rise to a drop thereof, as conventionally experienced, even when sintered at a relatively low temperature, the required amounts of free graphite as well as of the solid lubricating magnesium silicate minerals, boron nitride and manganese sulfide are allowed to exist on or in the grain boundary of the alloy matrix. Thus, this sintered sliding member excels in both wear resistance under high pressure conditions and machinability, and so can be used as bearings needing cutting work, thereby increasing the service life of cutting tools and boosting the productivity.

Furthermore, the sliding member of this invention can also be applied to bearings used under high pressure conditions, like valve guides, etc. of internal combustion engines, thereby increasing further the service life thereof. This is in part on account of the oil retention of the member.

Still further, the sliding member of this invention is relatively stable to heat and has not suffered dehydration and decomposition in the course of sintering; it may be produced by ordinary sintering techniques at lower costs.

Thus, the present invention can provide iron-based sintered sliding members at lower costs, which comprise sintered alloys having wear resistance and free cutting properties lending themselves well fit for various bearings, etc. used under high pressure conditions.

What is claimed is:

1. A sintered metal part comprising a metal matrix wherein a magnesium metasilicate mineral, or a magnesium metasilicate mineral and a magnesium orthosilicate mineral, or at least one of a magnesium metasilicate mineral and a magnesium orthosilicate mineral and at least one of boron nitride and manganese sulfide been dispersed throughout the metal matrix.

2. A sintered metal part comprising a metal matrix wherein a magnesium metasilicate mineral, or a magnesium metasilicate mineral and a magnesium orthosilicate mineral, or at least one of a magnesium metasilicate mineral and a magnesium orthosilicate mineral and at least one of boron nitride and manganese sulfide have been dispersed throughout the metal matrix in a total amount of 0.1 to 4% by weight.

3. A sintered metal part as claimed in claim 1 which is an internal combustion engine valve seat.

4. A sintered metal part as claimed in claim 1 which is an internal combustion engine valve guide.

5. A sintered metal part as claimed in claim 1 or which is an oil-impregnated bearing.

6. A sintered metal part as claimed in claim 1 which is a slug for plastic working.

7. A method for producing a sintered metal part including the steps of compression forming and sintering a die feed material, a substantial portion of which comprises metal powders, wherein a magnesium metasilicate mineral powder, or a magnesium metasilicate mineral powder and a magnesium orthosilicate mineral powder, or at least one of a magnesium metasilicate mineral powder and a magnesium orthosilicate mineral powder and at least one of a boron nitride powder and a manganese sulfide powder has been dispersed throughout said die feed material in a total amount of 0.1 to 4% by weight.

8. A method as claimed in claim 7, wherein
said magnesium metasilicate mineral powder is at least one of enstatite, clinoenstatite, enstenite and hypersthen powders and said magnesium orthosilicate mineral powder is at least one of forsterite and chrysolite powders.

9. An iron-based sintered sliding member comprising a metal matrix which is of a structure that free graphite and an intercrystalline inclusion have been dispersed throughout the metal matrix that consists essentially of, in weight ratio, 1.5 to 4% of carbon, 1 to 5% of copper, 0.1 to 2% of tin, 0.1 to 0.5% of phosphorus, 0.5 to 2% of an intercrystalline inclusion and the balance of Fe and has a mixed structure of a pearlite matrix with a steadite phase, said intercrystalline inclusion being a magnesium metasilicate mineral, or a magnesium metasilicate mineral and a magnesium orthosilicate mineral, or at least one of a magnesium metasilicate mineral and a magnesium orthosilicate mineral and at least one of boron nitride and manganese sulfide.

10. An iron-based sintered sliding member as claimed in claim 9, wherein said magnesium metasilicate mineral is at least one of enstatite, clinoenstatite, enstenite and hypersthen and said magnesium orthosilicate mineral is at least one of forsterite and chrysolite.

11. A sintered metal part as claimed in claim 2, which is an internal combustion engine valve seat.

12. A sintered metal part as claimed in claim 2, which is an internal combustion engine valve guide.

13. A sintered metal part as claimed in claim 2, which is an oil-impregnated bearing.

14. A sintered metal part as claimed in claim 2, which is a slug for plastic working.

* * * * *